United States Patent [19]

Figuereo

[11] 4,347,050
[45] Aug. 31, 1982

[54] EXTRUSION VESSEL WITH CONTROLLED CIRCULAR DISTRIBUTION OF THE EXTRUDED MATERIAL

[76] Inventor: Blaise F. Figuereo, 344, rue Paul Doumer, 78510 Triel sur Seine (Yvelines), France

[21] Appl. No.: 218,103

[22] Filed: Dec. 19, 1980

[30] Foreign Application Priority Data

Dec. 19, 1979 [FR] France ................................ 79 31048
Nov. 21, 1980 [FR] France ................................ 80 24721

[51] Int. Cl.³ .............................................. B29F 3/04
[52] U.S. Cl. ................................ 425/72 R; 264/40.7; 264/209.8; 425/190; 425/192 R; 425/376 A; 425/380; 425/466; 425/467
[58] Field of Search ............... 425/467, 465, 461, 380, 425/376 A, 381, 326.1, 72 R, 190, 192 R, 466, 145, 146; 264/209.8, 40.7

[56] References Cited

U.S. PATENT DOCUMENTS

| | | | |
|---|---|---|---|
| 2,805,446 | 9/1957 | Bartoo | 425/466 |
| 2,824,337 | 2/1958 | Covington, Jr. et al. | 425/466 |
| 2,944,287 | 7/1960 | Moran | 264/209.8 |
| 3,453,690 | 7/1969 | Mayner | 425/381 |
| 3,477,097 | 11/1969 | Plymale | 425/326.1 |
| 3,535,739 | 10/1970 | Mehnert | 425/381 |
| 3,570,062 | 3/1971 | Dukert et al. | 425/326.1 |
| 3,583,033 | 6/1971 | Christofas et al. | 425/326.1 |
| 3,709,645 | 1/1973 | Mraz | 425/467 |
| 3,815,637 | 6/1974 | Carrow | 425/376 A |
| 4,038,017 | 7/1977 | Langecker | 425/466 |

FOREIGN PATENT DOCUMENTS

2380123 10/1978 France ................................ 425/461

*Primary Examiner*—Jeffery R. Thurlow
*Attorney, Agent, or Firm*—Rodgers & Rodgers

[57] ABSTRACT

The present invention concerns an integrated die extrusion vessel with controlled circular distribution of the extruded material. In particular its object is an extrusion vessel or head which can be fitted by its base to the exit of an extruder and which comprises at its top a die including radial distributing means equidistant from each other on the same circumference and designed to calibrate and control the flow rate of the strands of extruded material coming from the extruder and passing through crown arranged orifices and passing through the base plate of the vessel, and further designed to balance match these material strands to the geometry of the shaped section before they enter the die.

8 Claims, 3 Drawing Figures

EXTRUSION VESSEL WITH CONTROLLED CIRCULAR DISTRIBUTION OF THE EXTRUDED MATERIAL

In the present art of extruding thermoplastics, several types of extruder heads are known, for instance, those designed to control as much as possible the three main turbulent zones of the material leaving the extruder before entering the die, the first of these zones being located at the end of the extruder screw, the second upstream and the third downstream of the die. In an attempt to eliminate these turbulences, known extruder heads for the most part include means for orienting the flow of the extruded material; these means however do present difficulties when a precise geometric shape is desired. In one device an extruder head is provided that directs the flow of the extruded material strands from orifices in the base plate of the exit plate or tip of the die. The material strands at the orifice exits force hinged lids or valves arranged around a central cone to open due to the force they exert in the direction of the die. Considering that the lid aperture could be externally controlled using an adjusting screw, it was possible to control the strand flow rate around the cone by drawing them more or less while imparting to them a direction centering on the die.

However, in spite of these improvements in extrusion techniques it still has remained difficult to achieve extruded shaped sections of constant and perfect geometry. As a consequence, by this invention it is provided that by replacing the hinged lids that opened by the force exerted on them from the material strands with radial and sliding distributors which can be controlled to a specific calibration or open cross-section, it is possible to control and check the flow rate as well as the cross-section of each strand, in a constant manner and as a function of the geometry of the extruded shaped section. Moreover, after numerous experimentations, this inventor has determined that the extruded shaped section maintains a perfectly uniform geometry in the course of the extrusion provided all the calibrated strands essentially cover the same distance between their calibration or distribution point and their entry point in the rear side of the die. In order to achieve such an essentially equivalent path distance for each calibrated material strand leaving each of the distributors arranged radially as a crown, the inventor was led to shape the rear entry side of the extruder die into a configuration which is homothetic to that of the crown distribution points when the distributors are in the calibrated controlled position. Consequently, based on these criteria, the inventor conceived and perfected extrusion vessel which allows the manufacturing of a die made shaped section, whether tubular or not, of a constant geometry.

The improved extruder vessel is designed to extrude, in particular, thermoplastic materials of tubular or other cross-section. It is mounted on the end of an extruder with its base plate affixed to the extruder and comprising orifices to form strands of material which are mutually equidistant and on the same circumference. Within the vessel, a frustum 7 is perforated by orifices located in the extension of the orifices to shape the material strands. The frustum is surrounded by radial concentric distributors mounted so as to be capable of sliding parallel to the central axis or the longitudinal axis of the vessel as a consequence of a position control operation actuated from the outside of the vessel. Each distributor is so designed that when it is actuated to move toward the base plate of the vessel, it reduces the passageway between it and the corresponding lateral surface of the frustum to which it corresponds and thereby calibrates the strand while also reducing its flow rate. The distributor lends itself to be displaced in one direction until it completely closes the orifice from which issues the strand or to be displaced in the opposite direction, that is toward the die, until a passageway of a cross-section substantially larger than that of one of said orifices is achieved.

Other features of the present invention will be made clear in relation to the description below provided for two illustrative and non-restrictive embodiment for an extrusion vessel as shown in the drawings wherein.

Figure 1:
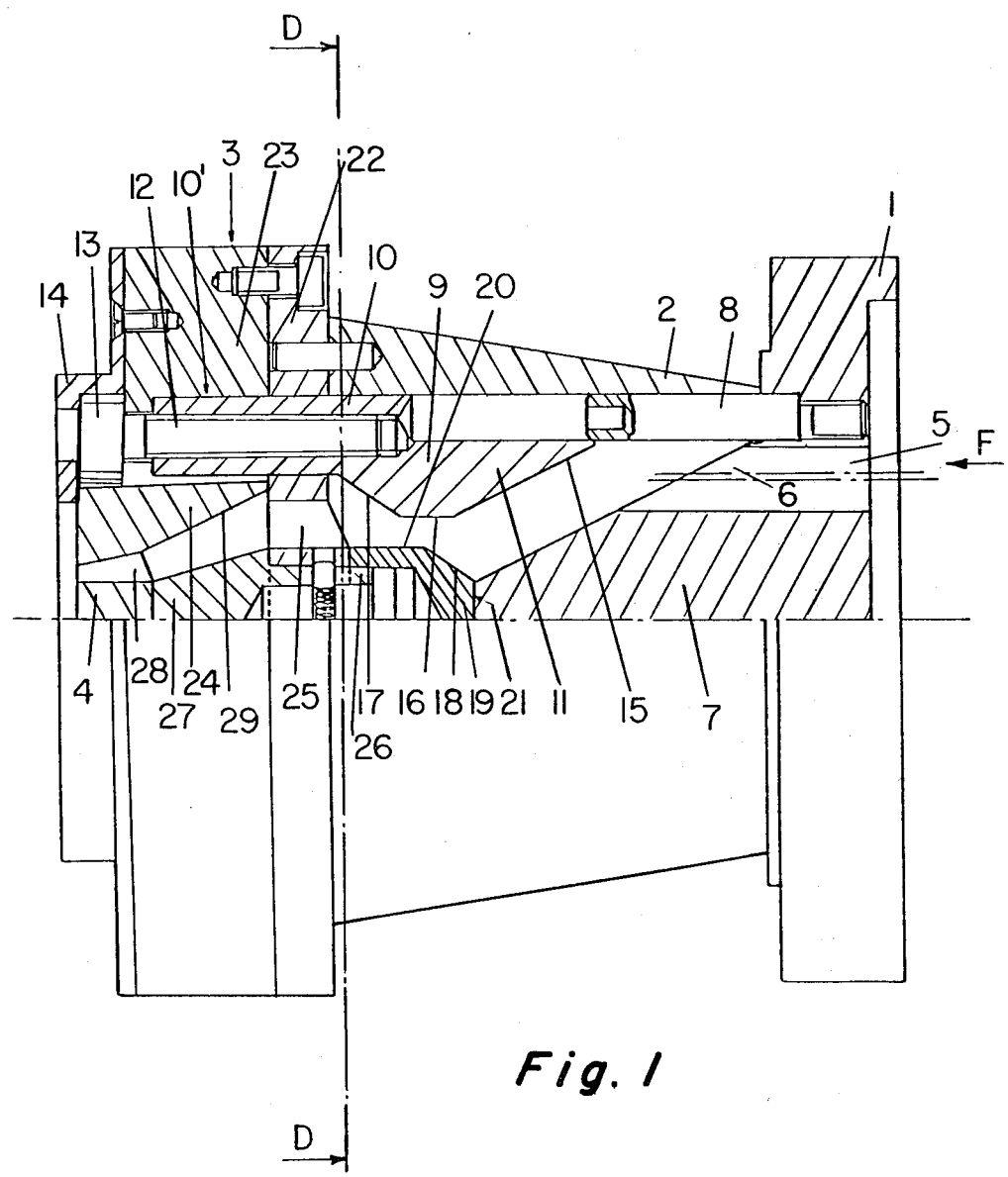
FIG. 1 is a longitudinal half-view section and a longitudinal external half view of an extrusion vessel with its head die.
Figure 2:
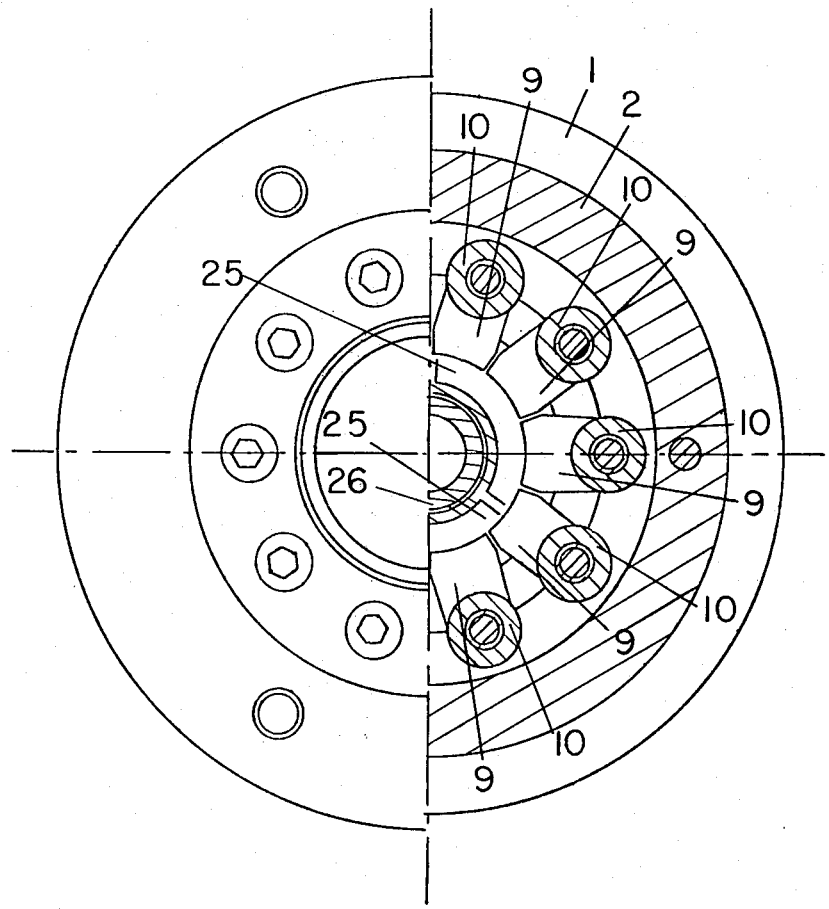
FIG. 2 is a cross-sectional half-view and an external front half-view of the vessel of FIG. 1, the cross-sectional view being along the arrows D—D of FIG. 1.

As shown in FIGS. 1 and 2, the extrusion vessel according to one form of this invention comprises a base plate 1 mounted on an extruder (omitted), an intermediate body part 2 fastened on base plate 1 and solidly joined to it, and a head part 3 fastened to part 2 and bearing an exit die set 4 designed to extrude a shaped section of a specific geometry.

The base plate 1 of the extrusion vessel is perforated by radial orifices 5 which are of equal diameters and form the extruded material strands at a given pressure determined by the die screw, the orifices 5 being positioned equidistantly on the same circumference of which the center is that of the vessel and through which passes the vessel's longitudinal axis. It must be borne in mind that the total cross-section of the orifices is equal to that generated by the cross-section of the die screw thread which extrudes the material in the direction of arrow F of FIG. 1. The orifices furthermore serve to cancel the rotation effect of the extruded material and to control its turbulence at the die exit. They are extended at the vessel side by orifices 6 which have corresponding diameters and are bored in frustum 7 and act to guide the strands of extruded material. Frustum 7 is fixed and solidly joined to base plate 1 and has a base circumference described outside the orifices 5.

The vessel body part 2 consists of an externally cylindrical or frustum shaped casing with a cylindrical bore concentric with the vessel and which is disposed outside the guide rods 8 of the members 9 which are distributors and calibrators for the extruded material strands when leaving the orifices 6. The rods 8 are fixed and locked in position by means of threaded bores in base plate 1 which are concentric with the orifices 5 and radially aligned with them. The distributors 9 include slide valves designed to be capable of sliding with arbitrary settings on rods 8. Each distributor 9 comprises a cylindrical slider body 10 provided with a radial projection 11 directed toward the center, or the longitudinal axis, of the vessel. The end of the cylindrical body of each distributor 9 which is located on the head part 3 side of the vessel engages in sliding adjustment a blind hole 10' of the vessel, the blind hole being adjusted and so located that the distributor can be displaced at will toward the base plate 1 or in the opposite direction and parallel to the longitudinal axis of the vessel by means of a setting screw 12 controlled from the forward end of the vessel. Each screw 12 passes through the vessel head part 3 and is thread held in the end of the cylindrical body of the corresponding distributor and bears a control knob 13 seated in end plate 14 of the vessel. Also, the projection 11 of each distributor evinces a substantially rectangular cross-section of which the width is selected so as to permit a slight play between one projection and the next and so that the totality of these cross-sections constitutes a circular crown with a continuous inside wall bounding the external calibration profile or the drawing of the extruded material strands. The longitudinal section of each projection 11 on the other hand is substantially of trapezoidal shape of which the big side 15 is parallel to the external slope of the frustum 7, the small base 16 is parallel to the vessel's longitudinal axis, and the small side 17 is parallel to the chamfer 18 of central annulus 19.

Further the height of each projection 11 is designed to seal its corresponding orifice 6 when the corresponding distributor 9 is displaced to its maximum excursion toward base plate 1. When distributor 9 is moved into its maximum excursion toward the head part 3, a specific and reduced passageway remains between the small base 16 and the cylindrical external wall 20 of annulus 19. Annulus 19 therefore is provided with an outer diameter larger than that of the small base 21 of frustum 7 and against which chamfer 18 is applied. Chamfer 18 is designed so that when any of the distributors 9 are displaced toward the base plate 1, the drawing or calibration passage as well as the flow rate limitation of the corresponding material strand will be increased between the small trapezoidal base 17 of the projection 11 and the chamfer 18. The minimum calibration passageway of the strand is possible on account of the adjustment of the distributor between the small base 16 and the cylindrical outer wall 20 of the annulus 19.

The head part 3 of the vessel comprises plate 22 applied to the forward end of the body 2 and bears a crown 23 in the bore of which is engaged pan 24 of the die set 4. Crown 23 also comprises end plate 14 fixed to its front end and control heads 13 of the setting screws 12. Plate 22 is crossed by passageways 25 in the form of circular segments directing the material strands calibrated by the distributors 9 toward the die set 4. Also passageways 25 have an inside diameter equal to the outside diameter of the annulus 19 and an outer diameter exceeding the diameter of the circle defined by the small bases 16 of projections 11. Moreover, plate 22 is provided with a central bore engaged by central spindle 26 of internal guide piece 27 for the calibrated strands in the extrusion passage 28 of die set 4. The strands are externally guided by the inside wall 29 of the pan 24. Also spindle 26 is made longer than the thickness of the central part of the plate 22 so that its free end engages the bore of the annulus 19 to align it with piece 27 and the central die body.

The outer wall of piece 27 and the inside wall of pan 24, which bound the extrusion chamber immediately downstream of the die, are shown in frustum shape, but they may be provided either one or both with a more pronounced conical shape or may be cylindrical in shape depending on the cross-sectional profile of the shaped section to be extruded. The rear side of the die, which is inside the vessel, and its extrusion passages are defined as a function of the geometry of the shaped section to be extruded and in homothetic relation to the configuration of the distribution of the strands calibrated and matched on account of the setting position of the distributors 9. More specifically, the die exit comprises an extruded material passage with a geometry and a cross-section identical with those of the shaped section to be extruded. The extension of this passage to the rear, or die entry, is of a progressively enlarging configuration in homothetic relation to its exit and the configuration of the distribution of the calibrated strands when leaving distributor 9 and before the strands enter the passages 25 of the plate 22. Also, because the rear die side is of a configuration in homothetic relation to the distribution of the calibrated strands, it follows that after calibration and control of the flow rates by distributor 9 identically long paths to reach the die entry are covered.

Therefore in operation the flow rate of the strands of extruded material is varied by longitudinal movement of distributors 9 by means of control knob 13 and the resultant activation of screw 12. Distributors 9 are aligned respectively with orifices 6 and are moveable toward base plate 1 to a point when the flow of material is completely stopped or moveable in the opposite direction whereby the flow rate and resultant material strand cross-section are increased. Therefore each distributor can be individually operated to achieve a variety of geometric cross-sections of the material flowing through the vessel.

Figure 3:
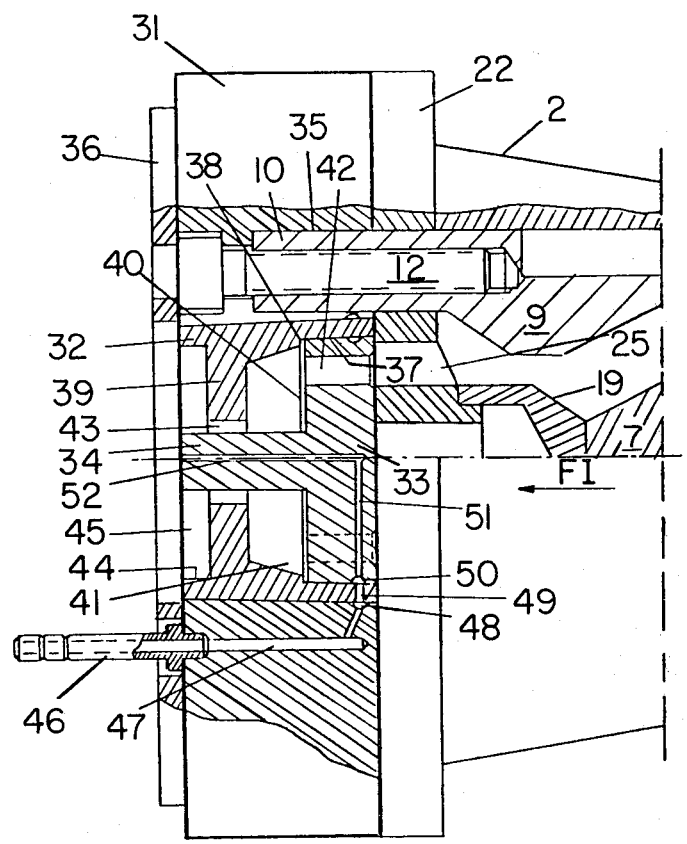
FIG. 3 is a partial sectional view of the extrusion die set for a second embodiment of the invention.

Referring now to FIG. 3, which shows a second embodiment of the die set fitted to the extrusion vessel head, it will be seen that this set comprises three pieces fitted conically into one another in the direction of flow of the calibrated strands of extruded material as denoted by the arrow F1. Essentially this embodiment comprises a circular assembly crown 31 on forward plate 22 of the vessel, an extrusion pan 32 fitted into the conical bore of crown 31 and a central block 33 fitted into this pan and provided with an axial extension 34 projecting through the bottom of the pan.

More specifically, the circular crown 31 is provided with three shoulders 35 corresponding to the radial position of the distributors 9 and designed to house in sliding adjustment the cylindrical body 10 of each corresponding distributor and position setting screw 12. Screw 12 is rotationally controlled from the front of the crown by introducing a key into the corresponding orifices of the front plate 36, thereby preventing the setting screws 12 from receding under the pressure exerted on the distributors by the extruded material strands. Crown 32 furthermore comprises holes (omitted) which are distributed circumferentially to accommodate the fastening screws on the forward plate 22 of the extrusion vessel.

The extrusion pan 32 comprises a shouldered conical bore part 37 which keeps the central block 33 locked in place in the direction of the arrow F1. The shoulder 38 of conical bore part 37 is located in such a manner as to define an extrusion chamber between the bottom 39 of the pan and the forward wall 40 of the body. Chamber 41 is disposed within the die and is of a cylindrical or frustum shape depending on the cross-section of the shaped section to be extruded, and receives the strands calibrated by the extrusion orifices 42 passing through block 33 and radially arranged downstream of the distributors 9. The bottom 39 of the pan comprises an axial orifice 43 precisely defining the shape of the outer wall of the shaped section to be extruded and crossed by axial extension 34 of block 33 defining the precise shape of the inside wall of the shaped section. Also pan 32 comprises a cylindrical bore part 44 bounding a protective cavity 45 in front of its bottom and into which projects the free end of the extension 34.

Moreover, to shore up the shaped section during extrusion ring 31 is provided with an injection passage for air which may be dusted or not, the passage being connected to an outside supply source by connector 46 issuing in a circumferential groove 48 within the bore of the ring 31. The groove 48 communicates by a radial hole 49 crossing the lateral wall of the pan 32 with another circumferential groove 50 fashioned in the outside wall of the body 30 and communicating by radial perforations 51 in this body with a blind hole 52 which is coaxial with the extension 34. Obviously the various perforations, grooves and blind hole allow to effectively distribute air which is dusted or not inside the shaped section immediately after it leaves the die.

Therefore, as can be seen from the description of the two embodiments of the integrated die extrusion vessel, the conditions required to extrude a shaped section with a constant cross-section and geometry are met. Indeed, as shown above the results are as follows:

capability of controlling the distributors for the extruded material strands arranged radially along a circular crown for the purpose of calibrating or drawing these strands to a given thickness homothetically related to the thickness of the shaped section to be extruded, whether of tubular shape or not;

capability of controlling and checking the flow rate of each strand of extruded material and in a constant manner;

guiding the strands controlled and tightly forced against one another until they join intimately as far as the rear entry of the die by making them over the same length of path.

In conclusion features are accomplished by distributor means 9 sliding longitudinally as controlled by the setting screws 12 and by means of the configuration of the die entry side which is homothetically related to the configuration of the strands of material at the exit of the distributor means 9, the latter configuration in turn being homothetical to the geometry of the shaped section to be extruded.

I claim:

1. An extrusion vessel for the controlled distribution of extruded material in combination with a die mounted at the exit of an extruder comprising a base plate (1), said base plate comprising one set of orifices (5) disposed therein, said orifices of said one set being disposed substantially in a circular pattern and substantially equidistant from each other, a frustum (7) secured to said base plate (1), said frustum (7) comprising a second set of orifices (6) aligned respectively with and in extension of said first set of orifices (5), distributors (9) aligned respectively with said second set of orifices (6), said distributors (9) being substantially parallel to the longitudinal axis of said vessel and respectively moveable in the direction of said base plate (1) to reduce the passage between the corresponding lateral surface of said frustums (7) and moveable in the opposite direction toward said die to achieve a passage equal to or greater than a cross-section equivalent to that of the corresponding one of said second set of orifices (6), and said distributors (9) comprising respectively projections (11) extending toward the center of said vessel.

2. An extrusion vessel according to claim 1 wherein multiple rods are secured to said base plate (1) and wherein said distributors (9) comprise respectively slider bodies (10) mounted on said rods.

3. An extrusion vessel according to claim 1 wherein each of said projections (11) is of rectangular cross-section and trapezoidal shaped in the longitudinal direction.

4. An extrusion vessel according to claim 1 wherein an annulus (19) extends from said frustum (7) remote from said base plate (1) and a plate (22) extends from said annulus (19) remote from said frustum (7).

5. An extrusion vessel according to claim 4 wherein the central portion of said plate (22) is provided with a guide piece (27).

6. An extrusion vessel according to claim 1 wherein said die comprises three pieces conically fitted into each other in the direction of flow of the extruded material, a circular crown (31) assembled on said plate (22), an extrusion pan (32) fitted into the conical bore of said circular crown (31) and provided in its central bottom part with axial orifice (43) precisely defining the shape of the outside wall of the shaped section to be extruded, and a central block (33) fitted into the extrusion pan (32) and provided with extrusion orifices (42) and an axial extension (34) engaging said axial orifice (43) of the central bottom part of said circular crown (31).

7. An extrusion vessel according to claim 6 wherein said circular crown (31) is provided with three shoulder means (35) corresponding to the radial position of said distributors (9).

8. An extrusion vessel according to claim 6 wherein said circular crown (31) is provided with an air injector passage.

* * * * *